United States Patent

Auger et al.

Patent Number: 6,051,638
Date of Patent: Apr. 18, 2000

[54] POLYOLEFIN PIPE

[76] Inventors: James Arthur Auger, 177 Coral Sands Place NE, Calgary, AB, Canada, T3J 3J2; Stan Allan Grabow, Site 12, Box 48, RR4, Calgary, Ab, Canada, T2M 4L4; Alexei Kazakov, 27 Sanderling Rise NW, Calgary, AB, Canada, T3K 3B1; Richard Kolasa, 57 Douglas View Circle SE, Calgary, AB, Canada, T2E 2P4

[21] Appl. No.: 09/019,660

[22] Filed: Feb. 6, 1998

[30] Foreign Application Priority Data

Mar. 10, 1997 [CA] Canada .................................. 2199556

[51] Int. Cl.[7] .................................. C08J 5/10; C08K 5/15
[52] U.S. Cl. .......................... 524/110; 524/108; 524/109
[58] Field of Search .................................. 524/108, 109, 524/110

[56] References Cited

U.S. PATENT DOCUMENTS 5,198,484  3/1993  Mannion .................................. 524/108

OTHER PUBLICATIONS

Gas Phase Ethylene Polymerization: Production Processes, Polymer Properties, and Reactor Modeling Tuyu Xie, Kim B. McAuley, James C.C. Hsu and David W. Bacon—Department of Chemical Engineering, Queen's University, Kingston, Ontario, Canada.

*Primary Examiner*—James J. Seidleck
*Assistant Examiner*—U. K. Rajguru
*Attorney, Agent, or Firm*—Kenneth H. Johnson

[57] ABSTRACT

Polyolefin pipes, and particularly gas pipe, in which the olefin polymer has been nucleated with from 1,500 to 10,000 ppm based on the weight of the polyolefin of a nucleating agent which is a dibenzylidene derivative of sorbitol or xylitol have an improved long term hydrostatic strength.

4 Claims, 1 Drawing Sheet

POLYOLEFIN PIPE

FIELD OF THE INVENTION

The present invention relates to polyolefin pipe. More particularly the present invention relates to polyolefin gas pipe nucleated with a dibenzylidene derivative of sorbitol having an improved long term hydrostatic strength.

BACKGROUND OF THE INVENTION

There are a number of types of polyolefin pipes available in the market. There are concerns about the durability of the pipes, and particularly gas pipes over the long term. One concern is the lifetime of the pipe under pressure typically from about 400 to 800 psi. One approach has been to try to reduce the crystal size in polyolefin pipes. While crystal size may be decreased in other polymers using nucleating agents the crystal size in polyethylene does not seem to be significantly affected by the presence of synthetic nucleating agents. As a result it is difficult to obtain the combinations of stiffness and toughness in polyolefin pipes (e.g. being tough but flexible as opposed to brittle) to obtain an increase in the long term hydrostatic strength of polyolefin gas pipes.

U.S. Pat. No. 5,198,484 issued Mar. 30, 1993 to Michael J. Mannion, assigned to Milliken Research Corporation discloses the use of derivatives of sorbitol and xylitol as clarifying agents in polyolefins and in particular polyethylene and polypropylene. The patent teaches that the bubbles may be reduced in products fabricated from polyolefins containing such agents by dissolving the "clarifying" agent in the polyolefin at a temperature of at least 170° C. However, the patent does not suggest any particular applications in which the polyolefins containing such "clarifying" agents are useful.

The present invention seeks to improve the long term hydrostatic strength of polyolefin pipes, such as gas pipes by incorporating such "clarifying" agents into the polyolefins used to manufacture such pipes.

SUMMARY OF THE INVENTION

Figure 1:
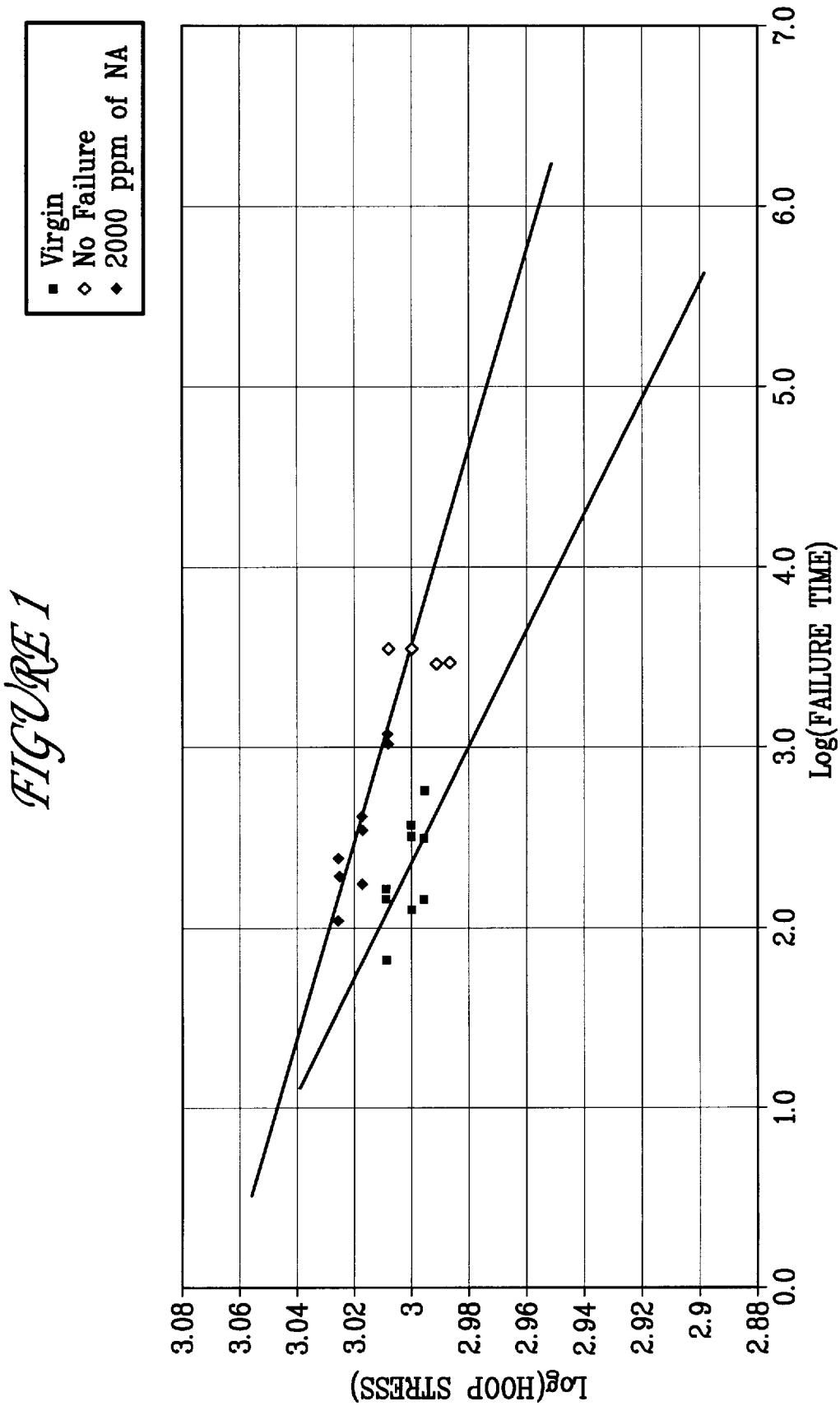
FIG. 1 is a drawing showing the long term hydrostatic strength of pipe made from virgin polyethylene and polyethylene containing the nucleating agent in accordance with the present invention.

The present invention provides a polyolefin pipe having a long term hydrostatic strength of at least 900 psi comprising a predominant amount of a polyolefin having a density from 0.940 to 0.970 g/cm$^3$, which polyolefin has been nucleated with from 1500 to 10,000 parts per million based on the weight of the polyolefin of a nucleating agent of the formula:

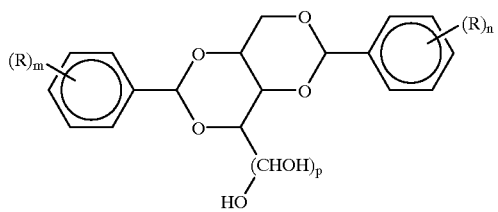

wherein each R is independently selected from the group consisting of $C_{1-8}$ alkyl radicals, $C_{1-4}$ hydroxyalkyl radicals, a hydroxy radical or a halogen atom, $C_{1-6}$ alkylthio radicals, $C_{1-6}$ alkylsulfoxy radicals; p is 0 or 1 and m and n are independently an integer from 0 to 3.

DETAILED DESCRIPTION

The olefin polymer suitable for use in the present invention is typically a polymer comprising at least 80, preferably at least 90 weight % of a monomer selected from the group consisting of ethylene and propylene, preferably ethylene, and up to 20, preferably not more than 10 weight %, of one or more $C_{4-10}$, preferably $C_{4-8}$ copolymerizable alpha olefins. The polymer may be a homopolymer of ethylene or may be a copolymer of ethylene and one or more higher alpha olefin such as 1-butene, 1-hexene or 1-octene, preferably butene.

The polyolefin will have a density of greater than 0.935 g/cm$^3$, preferably from 0.940 to 0.970 g/cm$^3$, most preferably from 0.940 to 0.960 g/cm$^3$. Typically the polyolefin will have a flow rate (grams of polymer which can be extruded from a 0.04125 inch (1.0478 mm) orifice in 10 minutes at 190° C. under a force of 21.60 kg) of from about 10 to 20, preferably from about 12 to 17. (Also see ASTM D1238.)

The polyolefin may be produced using a number of methods, such as gas phase, slurry and solution phase polymerization. These methods are well known to those skilled in the art and are disclosed in a number of patents filed in the names of Union Carbide Corporation, Union Carbide Chemicals & Plastics Technology Corporation, BP Chemicals, Phillips, The Dow Chemical Company and DuPont Canada Inc. A good survey of the technology relating to the manufacture of polyethylene is the paper *Gas Phase Ethylene Polymerization: Production Processes, Polymer Properties and Reactor Modeling,* Ind. Eng. Chem. Res. 1994, 33, 449–479 by Tuyu Xie, Kim B. McAuley, James C. C. Hsu, and David W. Bacon. From the above paper: generally gas phase polymerization may be carried out in a fluidized bed or a stirred bed reactor at temperatures from about 80–100° C., pressures from about 15–40 atm., typically less than 20 atm. in the presence of a co-ordination catalyst typically based on Ti or Cr to produce a homopolymer of ethylene or a copolymer of ethylene and one or more of 1-butene and 1-hexene having density up to 0.970 g/cm$^3$; slurry phase polymerization is carried out in a continuous stirred tank reactor (CSTR) or a loop reactor at pressures of 30–35 atmospheres at temperatures from about 85 to 110° C. in the presence of co-ordination catalysts to produce homopolymers and copolymers of ethylene having a density up to about 0.970 g/cm$^3$; and solution phase polymerization is conducted in a CSTR at pressures below 100 atm., temperatures from about 140–200° C., in the presence of co-ordination catalysts to produce homo and copolymers of ethylene (in which the comonomer may also include octene) having a density up to 0.970 g/cm$^3$.

The nucleating agent in accordance with the present invention has the formula:

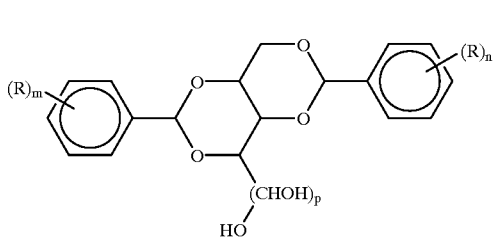

wherein each R is independently selected from the group consisting of $C_{1-8}$ alkyl radicals, $C_{1-4}$ hydroxyalkyl radicals, a hydroxy radical or a halogen atom, $C_{1-6}$ alkylthio radicals, $C_{1-6}$ alkylsulfoxy radicals; p is 0 or 1 (D-xylitol and D-sorbitol derivatives respectively) and m and n are independently an integer from 0 to 3. Preferably, in formula I each R is independently selected from the group consisting of $C_{1-4}$ alkyl radicals or substituents and m and n are selected from the group consisting of 0,1 and 2 and p is 1 (e.g. sorbitol derivatives). Most preferably the nucleating agent is selected from the group consisting of dibenzylidene sorbitol (e.g. m and n are 0 and R is a hydrogen atom), di (p-methyl benzylidene) sorbitol (m and n are 1 and R is methyl), di (o-methyl benzylidene) sorbitol (m and n are 1 and R is methyl), di (p-ethylbenzylidene) sorbitol (m and n are 1 and R is ethyl), bis (3,4-dimethyl benzylidene) sorbitol (m and n are 2 and R is methyl), bis (3,4-diethylbenzylidene) sorbitol (m and n are 2 and R is ethyl), and bis trimethylbenzylidene) sorbitol (m and n are 3 and R is methyl). One commercially available nucleating agent is bis (3,4-dimethyl benzylidene) sorbitol).

The nucleating agent may be used in amounts from about 1,500 to about 10,000 parts per million (ppm) based on the weight of the polyolefin. Preferably the nucleating agent is used in amounts from 2,000 to 8,000, most preferably from 2,000 to 5,000 ppm based on the weight of the polyolefin.

The polyolefin may contain fillers and other additives. Typically the fillers are inert additives such as clay, talc, $TiO_2$ and calcium carbonate which may be added to the polyolefin in amounts up about 50, preferably less than 30 weight %. The polyolefin may contain typical amounts of antioxidants and heat and light stabilizers such as combinations of hindered phenols and one or more of phosphates, phosphites, and phosphonites typically in amounts of less than 0.5 weight % based on the weight of the polyolefin. Pigments may also be added to the polyolefin in small amounts.

The nucleating agent is blended with the polyolefin preferably in accordance with the teachings of U.S. Pat. No. 5,198,484—melt blending at a temperature above 170° C. a small particle size (from 176 to 420 mμ or passing through ASTME 11-61 40 mesh screen but not passing through ASTME 11-61 80 mesh screen) nucleating agent.

In practice, the components for the pipe may be dry blended and then passed through an extruder at a temperature from about 200 to 280° C., preferably from about 230 to 250° C. The extruder will have an annular die typically providing a pipe having a nominal pipe size from about 0.5 to 24 inches, preferably from 0.5 to 8 inches (1.27 cm to 60.96 cm, preferably from 1.27 cm to 20.32 cm). Smaller pipe has a diameter less than 4 inches (10.16 cm) while larger pipe has a diameter greater than 4 inches (10.16 cm).

The long term hydrostatic strength of the pipe may be determined by ASTM standard test method D-2837-96 in conjunction with D1598-86.

The present invention will be illustrated by the following non-limiting example in which, unless otherwise indicated, parts means parts by weight and % means weight %.

EXAMPLE 1

In the examples, NOVAPOL high density resin HD 2100-U is used, having a density of 0.941 g/cm$^3$ and a melt flow rate $I_{21}$ of 14 g/10 minutes under a load of 21 kg for 10 minutes. The polymer contained about 0.10 weight % of each of a hindered phenol antioxidant and a phosphite heat and light stabilizer (secondary antioxidant). The pipe compound also contained about 4% of a yellow color additive.

The control sample was extruded as a 1 inch nominal pipe without any additional additives. In the test sample 2,000 ppm of bis (3,4-dimethyl benzylidene) sorbitol sold under the trademark MILLAD 3988 was added to the polyethylene. The pipes were subjected to long term hydrostatic strength test as described above. The results of the test are shown in FIG. 1. The pipe made from the control sample had a long term hydrostatic strength of 828 psi while the pipe made in accordance with the present invention had a long term hydrostatic strength of 942 psi.

What is claimed is:

1. A polyolefin pipe prepared by dry blending the components and extrusion at a temperature from 230° C. to 250° C. having a long term hydrostatic strength of at least 900 psi as determined by ASTM D-2837-96 in conjunction with D-1598-86, wherein the walls of said pipe comprise a polyolefin having a density from 0.940 to 0.970 g/cm, which polyolefin has been nucleated with from 1,500 to 10,000 parts per million based on the weight of the polyolefin of bis (3,4-dimethylbenzylidene) sorbitol having a particle size from 176 to 420 μm.

2. The pipe according to claim 1, wherein said polyolefin comprises from 80 to 100 weight % of ethylene and from 0 to 20 weight % of one or more monomers selected from the group consisting of 1-butene, 1-hexene and 1-octene.

3. The pipe according to claim 2, wherein the polyolefin has a density from 0.940 to 0.960 g/cm$^3$.

4. The pipe according to claim 3, wherein the nucleating agent is present in an amount from 2,000 to 10,000 ppm based on the weight of the polyolefin.

* * * * *